(12) United States Patent
Collin

(10) Patent No.: US 12,235,109 B2
(45) Date of Patent: Feb. 25, 2025

(54) ABSOLUTE HEADING ESTIMATION WITH CONSTRAINED MOTION

(71) Applicant: NORDIC INERTIAL OY, Akaa (FI)

(72) Inventor: Jussi Collin, Akaa (FI)

(73) Assignee: Nordic Inertial Oy, Akaa (FI)

( * ) Notice: Subject to any disclaimer, the term of this patent is extended or adjusted under 35 U.S.C. 154(b) by 236 days.

(21) Appl. No.: 18/004,859

(22) PCT Filed: Jul. 2, 2021

(86) PCT No.: PCT/EP2021/068286
§ 371 (c)(1),
(2) Date: Jan. 9, 2023

(87) PCT Pub. No.: WO2022/008361
PCT Pub. Date: Jan. 13, 2022

(65) Prior Publication Data
US 2023/0349699 A1    Nov. 2, 2023

(30) Foreign Application Priority Data

Jul. 10, 2020    (DE) .......................... 10 2020 118 321

(51) Int. Cl.
*G01C 21/16* (2006.01)
*E02F 9/26* (2006.01)

(52) U.S. Cl.
CPC ............ *G01C 21/183* (2020.08); *E02F 9/264* (2013.01)

(58) Field of Classification Search
CPC .............................. G01C 21/183; E02F 9/264
See application file for complete search history.

(56) References Cited

U.S. PATENT DOCUMENTS

| | | |
|---|---|---|
| 3,127,774 A | 4/1964 | Fischer et al. |
| 4,166,406 A | 9/1979 | Maughmer |
| 4,321,678 A | 3/1982 | Krogmann |

(Continued)

FOREIGN PATENT DOCUMENTS

| | | |
|---|---|---|
| DE | 3229819 A1 | 2/1984 |
| WO | 2019189260 A1 | 10/2019 |
| WO | 2020071314 A1 | 4/2020 |

OTHER PUBLICATIONS

DE Appln. No. 102020118321.6, Search Report, May, 5, 2021, 7 pg., Machine Translation.

(Continued)

*Primary Examiner* — Hussein Elchanti
(74) *Attorney, Agent, or Firm* — CUENOT, FORSYTHE & KIM, LLC

(57) ABSTRACT

A declination of an object, an orientation of the object and/or a position of the object can be determined using a gyroscope. In this regard, the gyroscope can be mounted to the object. The gyroscope can be pivoted. An undetermined pivoting of the object about an axis with the gyroscope can be measured. A component of a rotation of Earth acting on the gyroscope can be determined using the undetermined pivoting and the pivoting angular velocity ($w_{carousel}$). At least one parameter set can be determined. The pivoting angular velocity ($w_{carousel}$) of the gyroscope about the swivel axis with a second sensor can be determined.

16 Claims, 3 Drawing Sheets

(56) References Cited

U.S. PATENT DOCUMENTS

| | | | |
|---|---|---|---|
| 2011/0313703 A1 | 12/2011 | Petillon et al. | |
| 2013/0192072 A1* | 8/2013 | Gnepf | G01B 11/26 |
| | | | 33/228 |
| 2013/0238280 A1 | 9/2013 | Kagan et al. | |
| 2015/0094980 A1 | 4/2015 | Collin | |
| 2018/0345533 A1* | 12/2018 | Hernandez | E04B 1/3505 |
| 2019/0066323 A1* | 2/2019 | Li | G06F 18/22 |
| 2020/0033131 A1 | 1/2020 | Reid et al. | |
| 2021/0017738 A1 | 1/2021 | Sano | |
| 2021/0214919 A1 | 7/2021 | Okada et al. | |
| 2021/0340725 A1* | 11/2021 | Velde | G05G 5/12 |

OTHER PUBLICATIONS

WIPO Appln. PCT/EP2021/068286, Written Opinion and International Search Report, Feb. 9, 2022, 22 pg.

Titterton, D. et al., "Strapdown Inertial Navigation Technology" 2n Ed., The Institution of Engineering and Technology (IET), Radar, Sonar, Navigation and Avionics, Series 17, 2004, (Chap. 3, Figs 3.23 and 3.14; Chap. 10), 49 pg.

Niu, X. et al., "WM-INS: A Wheel Mounted IMU Based Integrated Navigation System for Wheeled Robots," arXiv preprint, arXiv:1912.07805, 2019, 7 pg.

Seraji, H. "Configuration control of redundant manipulators: Theory and implementation," IEEE Transactions on Robotics and Automation, Aug. 1989, vol. 5, No. 4, pp. 472-490.

WIPO Appln. PCT/EP2021/068286, Partial International Search, Oct. 26, 2021, 3 pg.

DE Appln. No. 102020118321.6, Search Report, May, 5, 2021, 7 pg.

\* cited by examiner

ABSOLUTE HEADING ESTIMATION WITH CONSTRAINED MOTION

CROSS-REFERENCE TO RELATED APPLICATIONS

This application claims the benefit of International Application No. PCT/EP2021/068286 filed on Jul. 2, 2021 and Germany Application Number 10 2020 118 321.6 having a priority date of Jul. 10, 2020, which are fully incorporated herein by reference.

BACKGROUND

The present disclosure relates to a method for determining at least one of a declination, an orientation and a position of an object.

SUMMARY

A method for determining at least one parameter selected from a group consisting of a declination of an object, an orientation of the object and a position of the object. The method can include pivoting a gyroscope, the gyroscope mounted to the object, at a pivoting angular velocity ($w_{carousel}$) about a swivel axis, wherein the object is a vehicle or a part of a vehicle, the vehicle including a first vehicle part and a second vehicle part, the first vehicle part is pivotable about the swivel axis relative to the second vehicle part, and the gyroscope is mechanically mounted to the first vehicle part. The method also can include measuring an undetermined pivoting of the object about an axis with the gyroscope, wherein the axis with the gyroscope is different from the swivel axis. The method also can include determining a component of a rotation of Earth acting on the gyroscope using the undetermined pivoting and the pivoting angular velocity ($w_{carousel}$). The method also can include determining at least one parameter set selected from a group of parameter sets. The group of parameter sets can include a first parameter set including a declination value indicating a declination of the object, with respect to true north, from the component of the rotation of the Earth acting on the gyroscope. The group of parameter sets also can include a second parameter set including an orientation value indicating an orientation of the object with respect to an initial orientation of the object, a position value indicating a position of the object with respect to an initial position of the object, wherein the orientation of the object and the position of the object are determined by the undetermined pivoting, the pivoting angular velocity ($w_{carousel}$) and a distance travelled by the object, and at least one compensation value compensating for an influence of the component of the rotation of the Earth on the orientation of the object and the position of the object. The method also can include determining the pivoting angular velocity ($w_{carousel}$) of the gyroscope about the swivel axis with a second sensor, wherein the second sensor is distinct from the gyroscope.

A system for determining at least one parameter selected from a group consisting of a declination of an object, an orientation of the object and a position of the object. The system can include the object, wherein the object is a vehicle or a part of the vehicle, the vehicle comprising a first vehicle part and a second vehicle part, and the first vehicle part is pivotable about a swivel axis relative to the second vehicle part. The system also can include a gyroscope mounted to the object, wherein the gyroscope is mechanically mounted to the first vehicle part. The system also can include a processing system configured to initiate operations. The operations can include pivoting the gyroscope at a pivoting angular velocity ($w_{carousel}$) about the swivel axis. The operations also can include measuring an undetermined pivoting of the object about an axis with the gyroscope, wherein the axis with the gyroscope is different from the swivel axis. The operations also can include determining a component of a rotation of Earth acting on the gyroscope using the undetermined pivoting and the pivoting angular velocity ($w_{carousel}$). The operations also can include determining at least one parameter set selected from a group of parameter sets. The group of parameter sets can include a first parameter set including a declination value indicating a declination of the object, with respect to true north, from the component of the rotation of the Earth acting on the gyroscope. The group of parameter sets also can include a second parameter set including an orientation value indicating an orientation of the object with respect to an initial orientation of the object, a position value indicating a position of the object with respect to an initial position of the object, wherein the orientation of the object and the position of the object are determined by the undetermined pivoting, the pivoting angular velocity ($w_{carousel}$) and a distance travelled by the object, and at least one compensation value compensating for an influence of the component of the rotation of the Earth on the orientation of the object and the position of the object. The operations also can include determining the pivoting angular velocity ($w_{carousel}$) of the gyroscope about the swivel axis with a second sensor, wherein the second sensor is distinct from the gyroscope.

DETAILED DESCRIPTION

Figure 1:
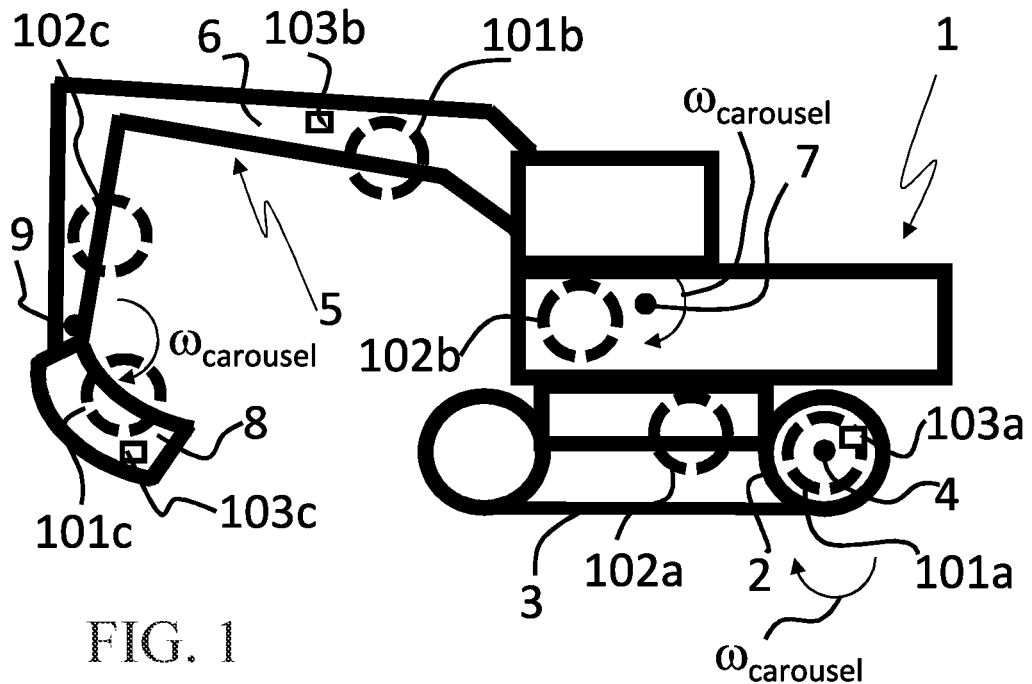
FIG. 1 is a schematic side view of an embodiment of an excavator.

The present disclosure relates to a method for determining at least one of a declination, an orientation and a position of an object, the method comprising the steps: pivoting a gyroscope, which gyroscope is mounted to the object, at a pivoting angular velocity about a swivel axis, measuring an undetermined pivoting of the object about an axis with the gyroscope, wherein the axis is different from the swivel axis; determining a component of the rotation of the Earth acting on the gyroscope using the undetermined pivoting, and the pivoting angular velocity; and either determining the declination of the object with respect to true north from the component of the rotation of the Earth acting on the gyroscope; or determining the orientation and the position of the object starting from an initial orientation and an initial position of the object using the undetermined pivoting, the pivoting angular velocity, and a distance travelled by the object, and compensating an influence of the determined component of the rotation of the Earth in the orientation and the position of the object.

In the prior art north finding systems are known in order to determine a declination of an object from true north. In these north finding systems, preferably, gyroscopes capable of sensing the Earth's rotation rate are often used, as they provide more self-contained measurements. From the declination of the object with respect to true north the orientation of the object may be determined.

Furthermore, it is known from the prior art to determine the orientation and the position of an object starting from an initial orientation and an initial position of the object by taking into account a distance travelled by the object from the initial position and considering an undetermined pivoting of the object about an axis. For this application it is recommendable to compensate any influence on the measurement of the pivoting of the object caused by the Earth's rotation rate.

The Earth's rotation rate is only about 15° per hour and measuring of this rate accurately and directly requires large and costly sensing devices, such as navigation grade inertial navigation systems. To reduce the requirements for such a gyro accuracy, sensor rotation techniques have been proposed through decades. In these techniques, the accuracy of the gyroscope is enhanced by rotating the gyroscope during the measurement about a swivel axis at a known angular velocity. This technique is also known as carouselling once the rotation is continuous or indexing once the rotation is incremental.

Modern vehicles use satellite-based positioning systems for navigation. At present, navigation systems in cars are predominantly used to guide a driver to find his way on-road and off-road.

Still, autonomous driving is coming and imposes more and more important tasks for navigation systems in vehicles. The less influence a human has on control of the vehicle the more important reliability of the navigation, positioning and orientation estimation becomes.

However, due to limitations by the scenery surrounding the vehicle a hundred percent coverage of satellite signals cannot be guaranteed under all circumstances. For example, availability and accuracy drops in urban canyons, on the ground like in tunnels or at mines or on roads with a shielding surrounding like high trees or rocks.

In order to bridge situations, wherein no satellite signal is available or only at poor quality, it would be desirable to integrate a gyroscope enabling determination of a component of the rotation of the Earth acting on the gyroscope into a vehicle.

This object according to the present disclosure is solved by a method for determining at least one of a declination, an orientation and a position of an object, the method comprising the steps: pivoting a gyroscope, which gyroscope is mounted to the object, at a pivoting angular velocity about a swivel axis, measuring an undetermined pivoting of the object about an axis with the gyroscope, wherein the axis is different from the swivel axis; determining a component of the rotation of the Earth acting on the gyroscope using the undetermined pivoting, and the pivoting angular velocity; and either determining the declination of the object with respect to true north from the component of the rotation of the Earth acting on the gyroscope; or determining the orientation and the position of the object starting from an initial orientation and an initial position of the object using the undetermined pivoting, the pivoting angular velocity, and a distance travelled by the object, and compensating an influence of the determined component of the rotation of the Earth in the orientation and the position of the object; wherein the object is a vehicle or a part of a vehicle, which vehicle comprises a first vehicle part and a second vehicle part; wherein the first vehicle part is pivotable about the swivel axis relative to the second vehicle part; wherein the gyroscope is mechanically mounted to the first vehicle part; and wherein the method further comprises the step determining the pivoting angular velocity of the gyroscope about the swivel axis with a second sensor, which second sensor is distinct from the gyroscope.

It is the basic concept of the present disclosure to provide a gyroscope mounted at a vehicle with the capability to determine at least the declination or the orientation of the vehicle or of a part of the vehicle taking into account a component of the rotation of the Earth acting on the gyroscope. In order to be able to determine a component of the rotation of the Earth acting on the gyroscope the gyroscope is pivoted at a pivoting angular velocity about a swivel axis, and a distinct sensor is used to measure this pivoting.

The present disclosure takes advantage of a vehicle comprising two vehicle parts which are pivotable about the swivel axis relative to each other. The gyroscope is mechanically mounted to one of the two vehicle parts, namely the first vehicle part. Then pivoting of the two vehicle parts relatively to each other provide a defined carouselling or indexing of the gyroscope.

By mounting the gyroscope at a first vehicle part which is pivoted relatively to a second vehicle part anyway carouselling or indexing of the gyroscope is available at considerable low costs and small footprint. This allows efficient gyroscope bias estimation.

In order to be able to use the pivoting motion of the gyroscope effected by the pivoting of the first and second vehicle parts relatively to each other about the swivel axis, the pivoting angular velocity of the first vehicle part about the swivel axis relatively to the second vehicle part is measured with a second sensor, which second sensor is distinct from the gyroscope. By measuring the pivoting angular velocity of the first vehicle part relatively to the second vehicle part, also the pivoting angular velocity of the gyroscope about the swivel axis is determined. The distinct second sensor provides pivoting angular velocity that is not affected by the Earth rate.

The method according to the present disclosure may be used in order to determine at least one of an orientation or a position of an object. Orientation in the sense of the present disclosure is part of the description how the object is placed in the space it occupies. Orientation refers to the imaginary rotation that is needed to move the object from a reference placement to its current placement. In contrast, the object's position is an imaginary translation which is needed to move the object from a reference placement to its current placement. The orientation and position together fully describe how the object is placed in space. According to the present disclosure, orientation of the object is referenced to true north.

The carouselling of the gyroscope according to the present disclosure is used to determine a component of the rotation of the Earth acting on the gyroscope. The determined component of the rotation of the Earth acting on the gyroscope according to the present disclosure is used in two different ways.

According to a first aspect the component of the rotation of the Earth acting on the gyroscope is used to determine the declination of the object with respect to true north. The declination according to the present disclosure is defined as the angle in a plane being horizontal at the location of the object between a pre-defined axis of the object and true north. The defined axis of the object has to be rotated by this angle an axis in order for the true north and the pre-defined axis of the object to coincide. True north is the direction along planet's surface towards the point where planet's axis of rotation meets its surface. True south can be defined in similar fashion.

In an embodiment subsequently the declination with respect to true north is used to determine the orientation of the object. Orientation according to the present disclosure is considered to comprise declination with respect to true north and information about at least one further rotation about a further pivoting axis that is needed to align the object from a pre-defined reference placement to its current placement.

Alternatively, the determined component of the rotation of the Earth acting on the gyroscope is used in order to enhance the precision of a determination of an orientation and a position of the object at a target orientation and a target position after the object has moved from a known initial orientation and a known initial position to the target orientation and target position. In this aspect, the undetermined pivoting of the object and a distance (path length) travelled by the object from the initial position to the target position are used to determine the orientation and the position of the object at the target position.

Earth rotation, if not accounted, causes deviation to pivoting angle and once this deviation is minimized one will obtain a more precise information on orientation.

In this aspect, the undetermined pivoting of the object and a distance, i.e. a path length, travelled by the object from the initial position to the target position are used to determine the orientation and the position of the object at the target position. The distance travelled is obtained by accumulating swivel axis pivoting angle and known dimensions of the part of a vehicle. A method to determine distance travelled is described in H. Seraji, "Configuration control of redundant manipulators: theory and implementation," in IEEE Transactions on Robotics and Automation, vol. 5, no. 4, pp. 472-490, August 1989, doi: 10.1109/70.88062.

This determination of the orientation and the position of the object at the target position is influenced by the rotation of the Earth superimposing on both swivel pivoting and the undetermined pivoting axes. By redundantly measuring the swivel pivoting angle with a sensor distinct from gyroscope the influence of the component of the rotation of the Earth can be compensated on both axes. The sensor distinct from gyroscope can be an accelerometer, a rotary encoder, a magnetometer, a vision sensor, or a light detection and ranging system, for example; such sensor should be capable of providing pivoting angle or pivoting angular velocity that is not affected by Earth rate.

In an embodiment of the present disclosure, the vehicle is a wheeled vehicle or a tracked vehicle, wherein the first vehicle part is a wheel, and wherein the second vehicle part is a frame or a body of the wheeled or tracked vehicle. In order to be able to use a wheel of the vehicle to deduce distance travelled from pivoting, it is necessary to know the wheel radius. It is apparent that once the vehicle is a tracked vehicle, the wheel in an embodiment is a wheel guiding the continuous track. In an alternative embodiment, the wheel is the steering wheel of the vehicle.

In a further embodiment of the present disclosure, the vehicle comprises a manipulator arm, wherein the first vehicle part is a first arm section of the manipulator arm, and wherein the second vehicle part is a second arm section of the excavator arm or a frame or a body of the vehicle.

Surprisingly, use of a pivoting motion of a manipulator arm leads to the similar results as use of a rotation of a wheel although the manipulator provides a pure pivoting of less than 360° and no full revolutions of rotation. Furthermore use of a manipulator arm to provide a pivoting motion of the gyroscope enables determination of the manipulator arm or parts thereof as an object in the sense of the present disclosure.

In the above disclosure, a carouselling or indexing based on a pivoting motion of a manipulator providing a defined pivoting motion of the gyroscope has only been described in combination with the determination of a component of the rotation of the Earth. However, using a pivoting motion of a manipulator of a vehicle can be considered an invention on its own without determination of a component of the rotation of the Earth acting on the gyroscope.

The present disclosure thus additionally relates to a method for determining at least one of an orientation or a position of an object, the method comprising the steps pivoting a gyroscope, which gyroscope is mounted to the object, at a pivoting angular velocity about a swivel axis; measuring an undetermined pivoting of the object about an axis with a gyroscope, wherein the axis is different from the swivel axis; and determining the orientation and the position of the object starting from an initial orientation and an initial position of the object using the undetermined pivoting, the pivoting angular velocity, and a distance travelled by the object, wherein the object is a vehicle or a part of a vehicle, which vehicle comprises a first vehicle part and a second vehicle part, wherein the first vehicle part is pivotable about the swivel axis relative to the second vehicle part; wherein the gyroscope is mechanically mounted to the first vehicle part; wherein the method further comprises the step measuring the pivoting angular velocity of the gyroscope about the swivel axis with a second sensor, which second sensor is distinct from the gyroscope; and wherein the vehicle comprises a manipulator arm, wherein the first vehicle part is a first arm section of the manipulator arm; and wherein the second vehicle part is a second arm section of the manipulator arm or a frame or a body of the vehicle.

In an embodiment of the present disclosure, the vehicle comprising a manipulator arm is an excavator, wherein the manipulator arm is an excavator arm.

In an embodiment of the present disclosure, the second sensor is an acceleration sensor, wherein the acceleration sensor comprises a known distance from the swivel axis.

In a further embodiment of the present disclosure, the pivoting is a rotation of 360° or more. It is apparent that for example a wheel of a wheeled or tracked vehicle during driving of the vehicle rotates at a given, but varying speed by full turns of 360° or more.

In a further embodiment of the present disclosure, the gyroscope is a microelectromechanical system (MEMS). Up to now, gyroscopes based on MEMS have not been able to measure a component of the rotation of the Earth acting on the gyroscope. However, by effective noise reduction and bias compensation, which inter alia is effected by the carouselling/indexing according to the present disclosure, commercially available and inexpensive MEMS based gyroscopes are applicable to determine a component of the rotation of the Earth.

In an embodiment of the present disclosure the gyroscope and the accelerometer form a six degree of freedom measurement system. In a so called six-degree-of-freedom measurement system the accelerometer and the gyroscope observe measurements from three non-parallel measurement axes (so called six-degree-of-freedom system).

Further advantages, features and applications of the present disclosure will become apparent from the following description of embodiments and the corresponding figures attached. The foregoing as well as the following detailed description of the embodiments will be better understood when read in conjunction with the appended drawings. It should be understood that the embodiments depicted are not limited to the precise arrangement and instrumentalities shown. In the figures, like elements have been denoted by identical reference numbers.

FIG. 1 is a schematic side view of an excavator 1 as an example of a vehicle in the sense of the present disclosure.

Reference numbers 101a, 101b, 101c denote MEMS based gyroscope located at different locations at the excavator. The gyroscopes are used to carry out the method according to the present disclosure. Reference numbers 102a, 102b, 102c denote different parts of the excavator 1, which qualify as an object of the present disclosure. Using the method as described in the present disclosure, at least the orientation or the position of the respective part 102a, 102b, 102c of the excavator 1 is determined.

In summary, the schematically drawn excavator allows for the following setups of gyroscopes 101a, 101b, 101c and objects 102a, 102b, 102c.

The gyroscope 101a is mounted on a wheel 2 guiding a continuous track 3 of the excavator 1. The wheel 2 is rotating about a swivel axis 4. The gyroscope 101a is used to determine the orientation and position of the chassis 102a of the excavator 1. In order to measure the pivoting angular velocity wcarousel of the gyroscope 101a an accelerometer 103a as a second sensor is mounted on the wheel 2.

The gyroscope 101b is mounted on a first arm section 102c of a manipulator arm 5. The manipulator arm 5 comprises the first arm section 102c and a shovel 8 as a second arm section). The first manipulator arm section 102c is pivotable about a swivel axis 7 relatively to the body 102b of the excavator 1. The gyroscope 101b is used to determine the orientation and position of the body 102b of the excavator 1. In order to measure the pivoting angular velocity wcarousel of the gyroscope 101b an accelerometer 103b as a second sensor is mounted at the first manipulator arm section 102c.

Furthermore, the shovel 8 is pivotable about a swivel axis 9 relatively to the first manipulator arm section 102c. The gyroscope 101c is mounted on the shovel 8. During operation the excavator 1 experiences a pivoting motion about the swivel axis 9 relatively to the first manipulator arm section 102c. In order to measure the pivoting angular velocity wcarousel of the gyroscope 101c an accelerometer 103c as a second sensor is mounted on the shovel 8.

As an example in the following paragraph determination of a deviation of the body 102b of the excavator 1 from true north is described.

The processing system takes a measured signal ω from the gyroscope 101, a measured signal a from the accelerometer 103b and an initial orientation $C_0$ as input and provides position p and orientation C as output f:

$$f(\omega, a, C_0) = \begin{bmatrix} p \\ C \end{bmatrix}.$$

The processing system allows to estimate the position of the chassis 102a via constraints due to motion of the wheel 2 and by iterations find best C. Assuming C is direction cosine matrix then derivative of it is $$\dot{C} = C[\omega x]$$

where [ω x] is skew symmetric matrix of gyroscope data. This is affected by Earth rate and distinct measurement for C or parts of C can be used to deduce the effect of Earth rate.

Once the effect of the Earth rate is minimized, C already contains absolutely referenced orientation information. To clarify why full orientation estimation is possible, one can see that both gravity and Earth rate are observable in the body reference frame, i.e. the reference frame fixed to the rotating gyroscope 101a and accelerometer 103a and are known in Earth frame, i.e. the reference frame fixed to Earth/Moon/Mars. Knowing two non-parallel vectors in this way means that full orientation information can be obtained as known in the art, e.g., from page 283, section 10.3.2 "Ground alignment methods" in D. Titterton, J. Weston: Strapdown Inertial Navigation Technology, Second Edition (Progress in Astronautics & Aeronautics), ISBN-13: 9781563476938, January 2005. Earth rate signal effected by the rotation of the Earth causes a slow turn of the vehicle. According to the present disclosure direction of Earth rate signal is estimated by finding a direction in which Earth rate causes least error to the navigation output. If the raw gyroscope signal is processed through inertial navigation algorithm, any constant signal component in it will be modulated to a sinusoid signal in computed acceleration. Examples for quasi constant signal component is a sensor bias caused by MEMS fabrication or Earth rate rotation. From the joint angle mechanics and vehicle wheel dimensions it is known that this sinusoidal signal is not real and but is synthetic due to the combined effect of forced rotation of the gyroscope 101a and quasi-stationary components. It is apparent that inertial navigation algorithm is very sensitive to constant offsets. If one looks at, for example, acceleration derived from inertial navigation algorithm and acceleration derived from joint angle mechanics (derived also with inertial sensors, but using angles and vehicle dimensions) one can figure out the component caused by Earth rotation. A minimization process finds an orientation that give the best agreement between angle-derived acceleration and inertial navigation-derived acceleration. This is similar to bias estimation for MEMS based devices as known from the prior art. The difference in acceleration based on inertial computations and dimension-based computations is minimized by trying different absolute orientations. This minimization can either be carried out in position or velocity domain, whichever fits best from a computational point of view. Earth rate determination is much more prone to noise than bias estimation, as Earth rate signal is very weak. However, over a longer period of time one can see a clear difference in acceleration, velocity and/or position derived from wrong absolute orientation.

For the following example it is assumed both accelerometer and gyroscope observe measurements from three non-parallel measurement axes (so called six-degree-of-freedom system).

Figure 2:
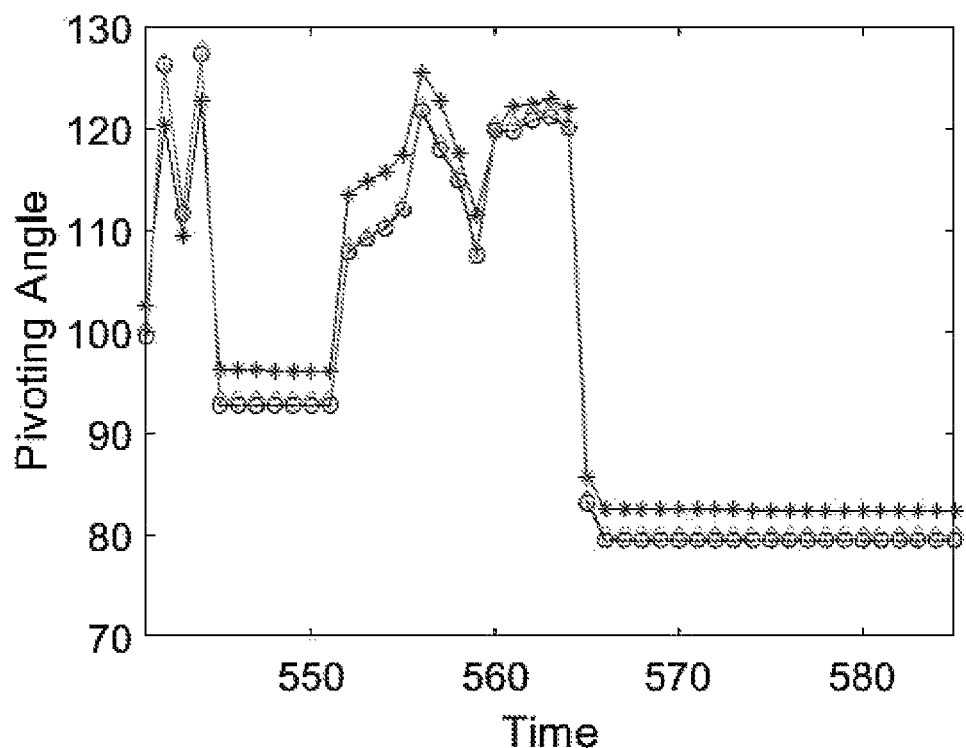
FIG. 2 is a diagram of a pivoting angle over time. The time derivative of pivoting angle is pivoting angular velocity.
Figure 3:
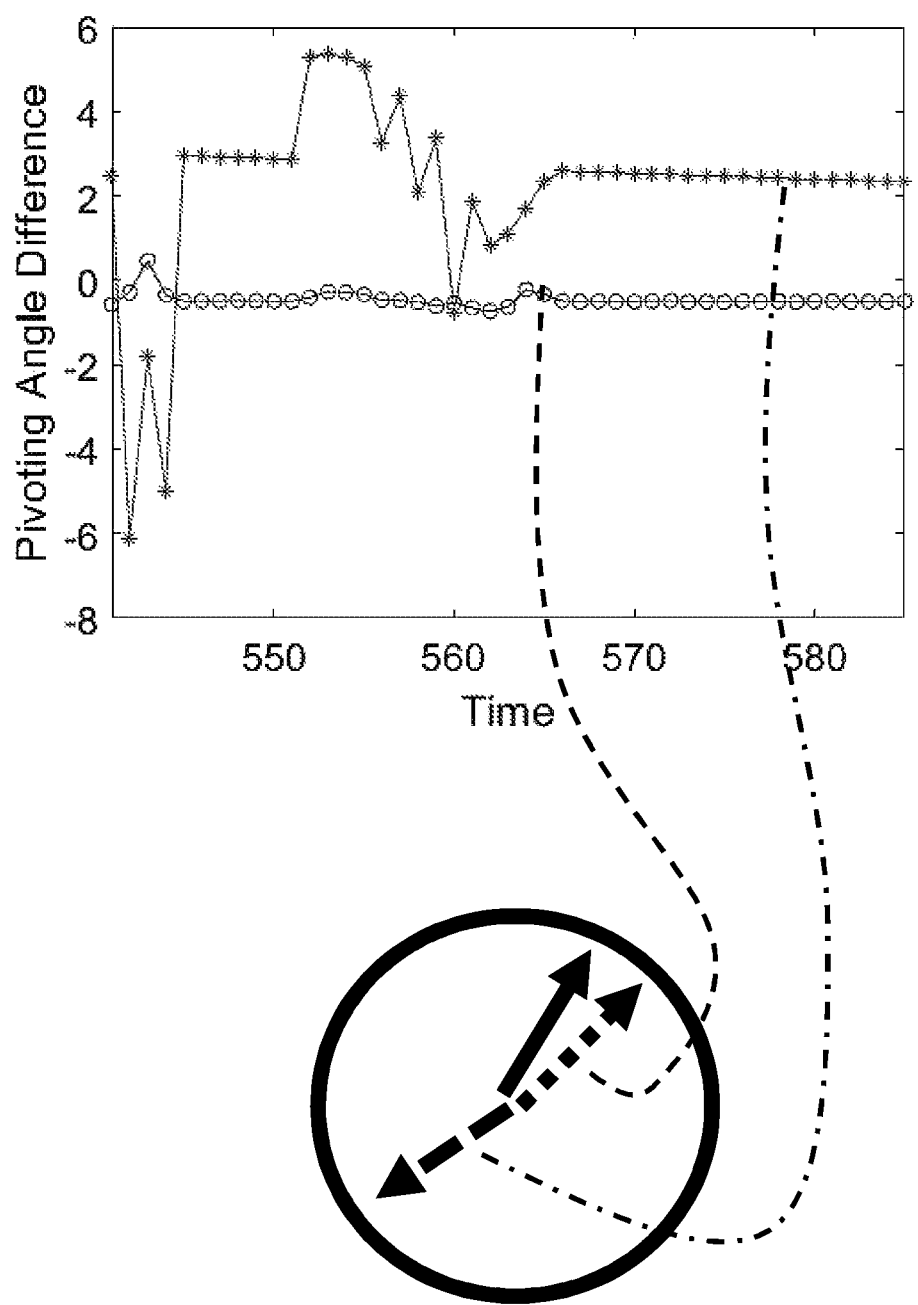
FIG. 3 is schematic diagram of difference of pivoting angles and corresponding declinations.

FIG. 2 shows pivoting angle of swivel axis 7 computed using inertial navigation equations known in prior art (e.g. "Local geographic navigation frame mechanization", page 31 in "Ground alignment methods", of D. Titterton, J. Weston: Strapdown Inertial Navigation Technology, Second Edition (Progress in Astronautics & Aeronautics), ISBN-13: 9781563476938, January 2005. Asterisks show the result when incorrect declination is given to the inertial navigation mechanization algorithm. Circles show the result when a better declination estimate is given to the algorithm. The deviation between these two is due to the Earth rate affecting the measurements. Diamonds show the pivoting angle computed by using the position computed by accelerometer (utilizing known dimensions) as external feedback to the inertial navigation mechanization system. FIG. 3 shows the difference between incorrect declination and feedback system result (asterisks) and difference between a better declination and feedback system (circles). It can be observed that the difference is smaller with better declination and thus algorithm that aims to minimize this difference solves the declination. FIG. 3 shows the corresponding declinations, showing the top-view of the excavator declination with solid arrow depicting true declination and corresponding declinations of FIG. 2. The method to minimize the difference can be brute force, or preferably a gradient search algorithm or Extended Kalman filter or modern machine learning method. The feedback system can be Extended Kalman filter with position update as known in the art. The position update derived from pivoting angle and vehicle dimensions is then considered as external measurement to the system. Preferably such filter contains state estimation for gyroscope biases and furthermore can be an Extended Kalman filter augmented by a neural network.

Figure 4:
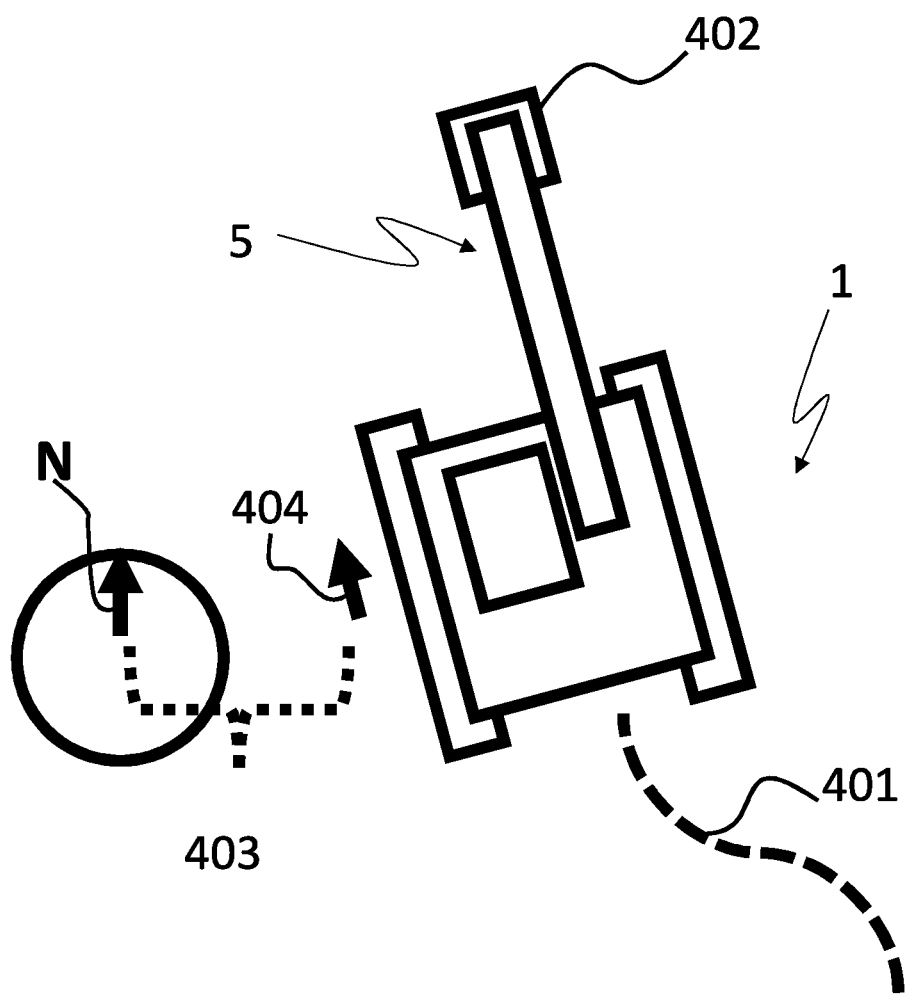
FIG. 4 is a schematic top view of the excavator of FIG. 1 in operation.

FIG. 4 shows a top view of the excavator 1 of FIG. 1 with trajectory, e.g. position history accumulated from declinations and distance traveled 401. The distance traveled 401 can be derived from known wheel radius and pivoting angles. Another distance traveled 401 can be computed from known dimensions of the manipulator arm 5 and known pivoting angles using vector addition—shovel position 402 with respect to center of the vehicle, for example. Declination is the angle 403 between true north N and object's main axis 404.

It is noted that features described in connection with one embodiment also can be used in other embodiments as is readily understandable by a person skilled in the art. While the invention has been described in detail and with reference to the Figures, this description is only an example and is not considered to restrict the scope of protection as it is defined by the claims. Known distance or radius can mean knowledge of such measure with mm, cm, meter level, for example.

In the claims the word "comprising" does not exclude other elements or steps and the undefined article "a" does not exclude a plurality. The mere fact that some features have been claimed in different claims does not exclude their combination. Reference numbers in the claims are not considered to restrict the scope of protection.

The invention claimed is:

1. A method for determining at least one parameter selected from a group consisting of a declination of an object, an orientation of the object and a position of the object, the method comprising:
   pivoting a gyroscope, the gyroscope mounted to the object, at a pivoting angular velocity ($w_{carousel}$) about a swivel axis, wherein the object is a vehicle or a part of the vehicle, the vehicle comprising a first vehicle part and a second vehicle part, the first vehicle part is pivotable about the swivel axis relative to the second vehicle part, and the gyroscope is mechanically mounted to the first vehicle part;
   measuring an undetermined pivoting of the object about an axis with the gyroscope, wherein the axis with the gyroscope is different from the swivel axis;
   determining a component of a rotation of Earth acting on the gyroscope using the undetermined pivoting and the pivoting angular velocity ($w_{carousel}$);
   determining at least one parameter set selected from a group of parameter sets consisting of:
      a first parameter set comprising a declination value indicating a declination of the object, with respect to true north, from the component of the rotation of the Earth acting on the gyroscope; and
      a second parameter set comprising an orientation value indicating an orientation of the object with respect to an initial orientation of the object, a position value indicating a position of the object with respect to an initial position of the object, wherein the orientation of the object and the position of the object are determined by the undetermined pivoting, the pivoting angular velocity ($w_{carousel}$) and a distance travelled by the object, and at least one compensation value compensating for an influence of the component of the rotation of the Earth on the orientation of the object and the position of the object; and
   determining the pivoting angular velocity ($w_{carousel}$) of the gyroscope about the swivel axis with a second sensor, wherein the second sensor is distinct from the gyroscope.

2. The method of claim 1, wherein:
   the vehicle is a wheeled vehicle or a tracked vehicle, wherein the first vehicle part is a wheel, the wheel comprising a known wheel radius; and
   the second vehicle part is a frame or a body of the wheeled vehicle.

3. The method of claim 1, wherein:
   the vehicle comprises a manipulator arm;
   the first vehicle part is a first arm section of the manipulator arm; and
   the second vehicle part is a second arm section of the manipulator arm or the second vehicle part is a frame or a body of the vehicle.

4. The method of claim 1, wherein:
   the second sensor is an acceleration sensor; and
   the acceleration sensor is positioned at a known distance from the swivel axis.

5. The method of claim 1, wherein the pivoting is a rotation of at least 360°.

6. The method of claim 1, wherein the gyroscope is a microelectromechanical system.

7. The method of claim 1, wherein:
   the second sensor is an accelerometer; and
   the gyroscope and the accelerometer form a six degree of freedom measurement system.

8. The method of claim 1, further comprising determining the orientation of the object from the declination of the object with respect to the true north.

9. A system for determining at least one parameter selected from a group consisting of a declination of an object, an orientation of the object and a position of the object, comprising:
   the object, wherein the object is a vehicle or a part of the vehicle, the vehicle comprising a first vehicle part and a second vehicle part, and the first vehicle part is pivotable about a swivel axis relative to the second vehicle part;
   a gyroscope mounted to the object, wherein the gyroscope is mechanically mounted to the first vehicle part; and
   a processing system configured to initiate operations comprising:
      pivoting the gyroscope at a pivoting angular velocity ($w_{carousel}$) about the swivel axis;
      measuring an undetermined pivoting of the object about an axis with the gyroscope, wherein the axis with the gyroscope is different from the swivel axis;
      determining a component of a rotation of Earth acting on the gyroscope using the undetermined pivoting and the pivoting angular velocity ($w_{carousel}$);

determining at least one parameter set selected from a group of parameter sets consisting of:
- a first parameter set comprising a declination value indicating a declination of the object, with respect to true north, from the component of the rotation of the Earth acting on the gyroscope; and
- a second parameter set comprising an orientation value indicating an orientation of the object with respect to an initial orientation of the object, a position value indicating a position of the object with respect to an initial position of the object, wherein the orientation of the object and the position of the object are determined by the undetermined pivoting, the pivoting angular velocity ($w_{carousel}$) and a distance travelled by the object, and at least one compensation value compensating for an influence of the component of the rotation of the Earth on the orientation of the object and the position of the object; and determining the pivoting angular velocity ($w_{carousel}$) of the gyroscope about the swivel axis with a second sensor, wherein the second sensor is distinct from the gyroscope.

10. The system of claim 9, wherein:
the vehicle is a wheeled vehicle or a tracked vehicle, wherein the first vehicle part is a wheel, the wheel comprising a known wheel radius; and
the second vehicle part is a frame or a body of the wheeled vehicle.

11. The system of claim 9, wherein:
the vehicle comprises a manipulator arm;
the first vehicle part is a first arm section of the manipulator arm; and
the second vehicle part is a second arm section of the manipulator arm or the second vehicle part is a frame or a body of the vehicle.

12. The system of claim 9, wherein:
the second sensor is an acceleration sensor; and
the acceleration sensor is positioned at a known distance from the swivel axis.

13. The system of claim 9, wherein the pivoting is a rotation of at least 360°.

14. The system of claim 9, wherein the gyroscope is a microelectromechanical system.

15. The system of claim 9, wherein:
the second sensor is an accelerometer; and
the gyroscope and the accelerometer form a six degree of freedom measurement system.

16. The system of claim 9, the operations further comprising determining the orientation of the object from the declination of the object with respect to the true north.

* * * * *